United States Patent
Park (10) Patent No.: US 12,240,401 B2
(45) Date of Patent: *Mar. 4, 2025

(54) NEGATIVE POISSON'S RATIO MATERIALS FOR IMPACT PROTECTION DEVICES

(71) Applicant: Joon Bu Park, Las Vegas, NV (US)

(72) Inventor: Joon Bu Park, Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 18/633,808

(22) Filed: Apr. 12, 2024

(65) Prior Publication Data

US 2024/0253588 A1 Aug. 1, 2024

Related U.S. Application Data (63) Continuation of application No. 18/157,473, filed on Jan. 20, 2023, now Pat. No. 11,975,669.

(51) Int. Cl.
*B60R 21/207* (2006.01)
*A41D 13/015* (2006.01)
(Continued)

(52) U.S. Cl.
CPC .......... *B60R 21/207* (2013.01); *A41D 13/015* (2013.01); *B60R 21/0136* (2013.01); *B60R 21/235* (2013.01); *B60R 2021/23504* (2013.01)

(58) Field of Classification Search
CPC .................. B60R 21/207; B60R 21/35; B60R 2021/23504
See application file for complete search history.

(56) References Cited

U.S. PATENT DOCUMENTS

| 6,627,275 B1 | 9/2003 | Chen |
| 7,160,621 B2 | 1/2007 | Chaudhari et al. |
| (Continued) | | |

FOREIGN PATENT DOCUMENTS

| AU | 2003280228 | 6/2004 |
| CA | 2506745 | 6/2004 |
| (Continued) | | |

OTHER PUBLICATIONS

InnovationInTextiles.com [online], "Smart Textiles," available on or before Aug. 8, 2022, via internet archive: Wayback Machine URL <https://web.archive.org/web/20220808221335/https://www.innovationintextiles.com/smart-textiles-nanotechnology/>, retrieved on Mar. 8, 2023, URL <https://www.innovationintextiles.com/smart-textiles-nanotechnology/>, 1 page.

(Continued)

*Primary Examiner* — Faye M Fleming
(74) *Attorney, Agent, or Firm* — Fish & Richardson P.C.

(57) ABSTRACT

An impact protection device includes a cushion formed from a first material having a negative Poisson's ratio (NPR) and a second material having a positive Poisson's ratio (PPR). The first material and the second material can be layered or can be formed as a matrix of cells. The impact protection device can be an airbag with the cushion coupled to an inflation source or an expulsion source for deploying the airbag in response to an impact. The impact protection device can also be an impact vest with the cushions positioned on the vest body for absorbing impact forces to the vest body. The combination of the NPR and PPR materials improve the impact absorption of the impact protection devices compared to conventional materials.

20 Claims, 8 Drawing Sheets

(51) Int. Cl.
    *B60R 21/0136*   (2006.01)
    *B60R 21/235*    (2006.01)

(56) References Cited

U.S. PATENT DOCUMENTS

| | | | |
|---|---|---|---|
| 7,350,851 | B2 | 4/2008 | Barvosa-Carter et al. |
| 10,064,452 | B1 | 9/2018 | Faruque et al. |
| 10,434,977 | B2 | 10/2019 | Chuang et al. |
| 10,589,711 | B2 | 3/2020 | Rousseau et al. |
| 11,220,765 | B2 | 1/2022 | Jayasuriya et al. |
| 11,464,270 | B2 | 10/2022 | Coyle et al. |
| 11,975,669 | B1* | 5/2024 | Park ............ B60R 21/0136 |
| 2006/0002783 | A1 | 1/2006 | Rudduck et al. |
| 2016/0108194 | A1 | 4/2016 | Topolkaraev et al. |
| 2017/0036626 | A1 | 2/2017 | Barbat et al. |
| 2022/0410778 | A1 | 12/2022 | Thyagarajan et al. |

FOREIGN PATENT DOCUMENTS

| | | |
|---|---|---|
| CN | 1715702 | 1/2006 |
| CN | 102729948 | 10/2012 |
| CN | 202703495 | 1/2013 |
| CN | 106427541 | 2/2017 |
| CN | 108032912 | 5/2018 |
| CN | 108297745 | 7/2018 |
| CN | 109421653 | 3/2019 |
| CN | 110103877 | 8/2019 |
| CN | 110775005 | 2/2020 |
| CN | 112572340 | 3/2021 |
| CN | 112606793 | 4/2021 |
| CN | 113525274 | 10/2021 |
| CN | 114269608 | 4/2022 |
| DE | 602005004701 | 2/2009 |
| DE | 102008047699 | 3/2010 |
| DE | 112006000538 | 8/2010 |
| DE | 102016013923 | 5/2017 |
| DE | 102016201556 | 8/2017 |
| DE | 102016014104 | 5/2018 |
| DE | 102017003109 | 10/2018 |
| DE | 102018115715 | 1/2019 |
| DE | 102018120917 | 2/2019 |
| DE | 102019116586 | 12/2020 |
| DE | 102019125190 | 3/2021 |
| DE | 102020126032 | 4/2021 |
| EP | 1576297 | 9/2005 |
| EP | 1612108 | 1/2006 |
| ES | 2303195 | 8/2008 |
| IN | 393803 | 3/2021 |
| IN | 202041049941 | 5/2022 |
| JP | 2006071093 | 3/2006 |
| KR | 20060048627 | 5/2006 |
| MX | 2018003165 | 11/2018 |
| MY | 143426 | 5/2011 |
| TR | 201918709 | 7/2021 |
| WO | WO 2004046568 | 6/2004 |
| WO | WO 2006096430 | 9/2006 |
| WO | WO 2020254218 | 12/2020 |
| WO | WO 2021053073 | 3/2021 |
| WO | WO 2021107901 | 6/2021 |
| WO | WO 2022116223 | 6/2022 |

OTHER PUBLICATIONS

International Search Report and Written Opinion in International Appln. No. PCT/US2024/011986, mailed on Mar. 15, 2024, 6 pages.

Wikipedia [online], "Airbag," available on or before Aug. 27, 2022, via internet archive: Wayback Machine URL <https://web.archive.org/web/20220827012903/https://en.wikipedia.org/wiki/Airbag> , retrieved on Mar. 8, 2023, URL <https://en.wikipedia.org/wiki/Airbag>, 33 pages.

* cited by examiner

NEGATIVE POISSON'S RATIO MATERIALS FOR IMPACT PROTECTION DEVICES

CROSS-REFERENCE TO RELATED APPLICATIONS

This application is a continuation application of and claims the benefit of priority to U.S. application Ser. No. 18/157,473, filed on Jan. 20, 2023, the contents of which are hereby incorporated by reference.

BACKGROUND

The present disclosure relates generally to materials for manufacture of impact protection devices, such as airbags, impact vests, and life preservers.

SUMMARY

We describe here impact protection devices formed from materials that exhibit a negative Poisson's ratio ("NPR materials"). NPR materials are durable and capable of attenuating or absorbing energy, such as energy from an impact. NPR materials in impact protection devices, such as airbags, attenuate energy in an impact, thereby reducing the force felt by a passenger being thrown into the airbag in a crash and preventing injury to the passenger. NPR materials generally absorb energy better than non-NPR materials (e.g., positive Poisson's ratio ("PPR") materials). Impact protection devices such as airbags and impact vests can be formed from NPR materials alone or in conjunction with PPR materials. In some implementations, composite materials that include both NPR and PPR materials are used. The use of NPR materials or NPR materials with PPR materials in an impact protection device can absorb more energy from an impact relative to a conventional impact protection device. By absorbing more energy in an impact, the NPR material device can reduce the incidence of injury from the impact to a person using the device (e.g., a person in a vehicle with an NPR material airbag, a person wearing an NPR material impact vest).

Impact protection devices typically are rapidly deployed to expand in response to an impact or other stimuli to soften the force of the impact felt by a human and to prevent injury to the human resulting from the force. For example, a vehicular airbag typically expands in response to a sensed impact to cushion a human being in a car crash. The airbag is quickly filled with a gas or other material after sensing an impact to the vehicle, and is typically located in a vehicle's steering wheel and dashboard, or in side panels of the vehicle.

Impact vests are another example of an impact protection device. An impact vest typically includes pads or cushions in a tightly-fitting vest or bodysuit to protect a wearer from impacts on the surface of water. Impact vests are worn during extreme water sports such as kite surfing, wake boarding, parasailing, and others, and can also be worn during non-aquatic activities such as air soft or paintball games.

NPR materials in impact protection devices such as airbags and impact vests can provide enhanced protection against injuries to humans resulting from impacts.

In an aspect, an airbag includes an expandable cover, a cushion positioned within the expandable cover, and an expulsion sources. The cushion includes a first material having a negative Poisson's ratio and a second material having a positive Poisson's ratio. The expulsion source is coupled to the cushion and expels the cushion from a constricted state to a deployed state in response to detection of an impact.

Embodiments can include one or any combination of two or more of the following features.

The first material and the second material include fibers.

At least a subset of the fibers of the first material and/or the second material are polyamide or polyester.

The cushion includes a matrix of cells of the first material and cells of the second material.

The cells of the first material are interspersed with the cells of the second material.

The cells of the first material and the cells of the second material are 3-D printed cells.

The cells of the first material and the cells of the second material are a 3-D printed foam material.

The cushion includes alternating layers of the first material and the second material, and an outer layer of the cushion includes the first material.

The airbag also includes a sensor coupled to the expulsion source, and the sensor detects an impact and provides a signal to the expulsion source to release the cushion from the constricted state.

In another aspect, an inflatable airbag includes a cover, an inflation source coupled to the cover, and a sensor coupled to the inflation source. The cover includes a first material having a negative Poisson's ratio. The inflation source provides inflation of the cover in response to detection of an impact. The sensor detects an impact and provides a signal to the inflation source to inflate the cover.

Embodiments can include one or any combination of two or more of the following features.

The airbag also includes a cellular matrix positioned within the cover, the cellular matrix including a material having a negative Poisson's ratio.

The cellular matrix includes a material having a positive Poisson's ratio.

The cover includes a second material having a positive Poisson's ratio, and the first material and the second material include polyamide or polyester fibers.

The cover includes a second material having a positive Poisson's ratio, and the first material and the second material include a matrix, with the first material embedded in the second material.

The cover includes a second material having a positive Poisson's ratio, and the cover includes alternating layers of the first material and the second material.

In another aspect, an impact vest includes a vest body including a front and a back, and one or more cushions positioned on at least one of the front and the back of the vest body. The one or more cushions including a first material having a negative Poisson's ratio, the one or more cushions positioned to protect a subject wearing the vest body by at least partially absorbing a force associated with an impact.

Embodiments can include one or any combination of two or more of the following features.

The one or more cushions includes a second material having a positive Poisson's ratio.

The one or more cushions includes alternating layers of the first material and the second material.

The one or more cushions includes cells of the first material interspersed with cells of the second material.

The one or more cushions inflate or expand upon detection of an impact.

Other embodiments are within the scope of the claims.

DETAILED DESCRIPTION

We describe here impact protection devices formed from materials that exhibit a negative Poisson's ratio ("NPR materials"). NPR materials are durable and capable of attenuating or absorbing energy, such as energy from impact. NPR materials in impact protection devices, such as airbags or impact vests, attenuate energy of an impact, thereby reducing the force of the impact felt by a human and preventing injury. NPR materials absorb energy better than non-NPR materials (e.g., positive Poisson's ratio ("PPR") materials), and lower the initial contact stress of the device with a person reducing the occurrence of sudden contact injury. Impact protection devices such as airbags and impact vests can be formed of NPR materials alone or in conjunction with PPR materials. In some implementations, composite materials that include both NPR and PPR materials are used.

NPR materials in airbags and other impact protection devices can provide enhanced strength during impact compared to traditional materials and can absorb energy from impacts to prevent injury to humans.

Figure 1A:
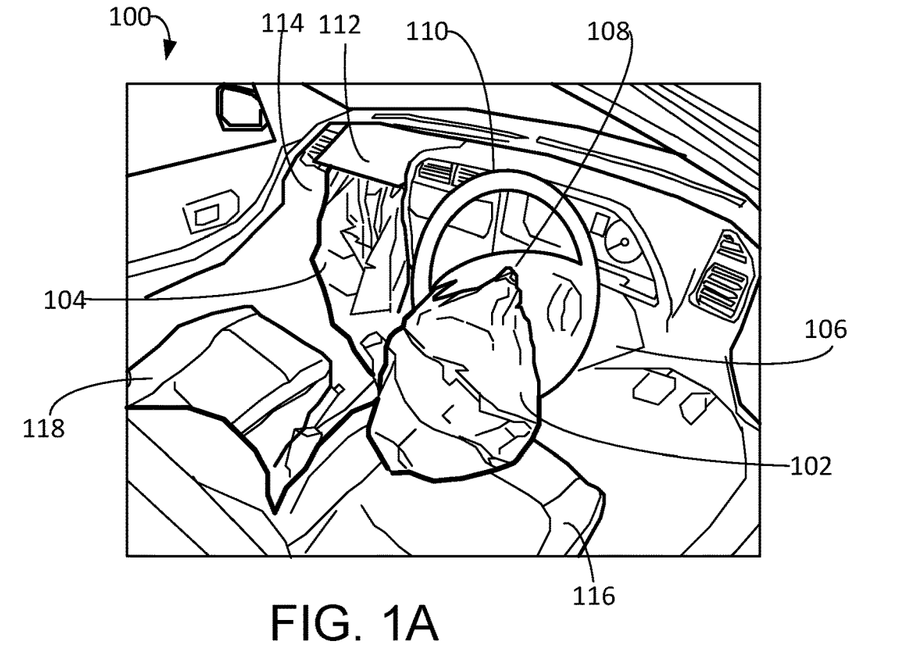
FIG. 1A is an illustration of airbags in a vehicle.

Referring to FIG. 1A, a vehicle interior 100 includes a first airbag 102 and a second airbag 104. The first airbag 102 is located in the steering column 106 and/or front panel 108 of a steering wheel 110. The second airbag is located in a receptacle 112 of the dashboard 114. The first airbag 102 is designed to deploy from a constricted and inert position to an expanded state in response to an impact to the vehicle to provide protection to a passenger in the front driver's seat 116 of the vehicle. The second airbag 104 is similarly designed to deploy to an expanded state in response to an impact to the vehicle to provide protection to a passenger in the passenger's seat 118 of the vehicle. When the vehicle is impacted in a crash, the passengers may be thrown forward. The first and second airbags 102, 104 prevent injury to the passengers of the vehicle by providing a cushion between the passenger and the hard surfaces of the vehicle like the dashboard 114 and steering wheel 110, e.g., by absorbing some of the impact force of the passenger being thrown against the front structures of the vehicle.

Figure 1B:
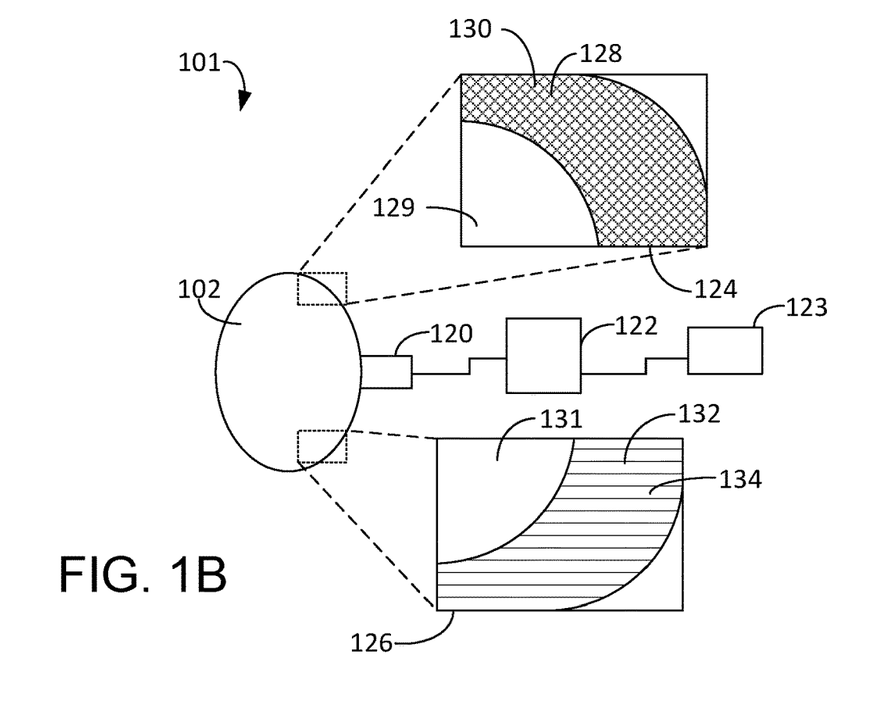
FIG. 1B is an illustration of an exemplary airbag.

The first airbag 102 and second airbag 104 can be deployed based on the sensing of an impact at the first airbag 102 and second airbag 104, respectively, or based on sensing of an impact elsewhere on or in the vehicle, such as at the front or rear bumper (not shown). Data from an impact sensor (e.g., as shown in FIG. 1B) can be relayed to a computer that is communicatively coupled to the first airbag 102 and second airbag 104 to prompt the airbags to deploy and inflate. For example, the sensor can be communicatively coupled to an inflation mechanism that fills the first airbag 102 and second airbag 104 with a fluid or gas when activated. The inflation mechanism or source (also referred to herein as an expulsion source or mechanism) can be a reservoir filled with a gas or liquid, one or more chemicals that expand when combined with air or with each other, a fluid source, a chemical explosive, a pump, or another mechanism that operates to fill the first airbag 102 and second airbag 104 with the fluid or gas in response to an activation signal. The filling of the first airbag 102 and second airbag 104 causes the first airbag 102 and second airbag 104 to expand from a first state out of the compartment in the steering column 106 and/or front panel 108 and receptacle 112 of the dashboard 114, respectively, and into a second deployed state.

While only two airbags are shown in the figure, additional airbags can be included in a vehicle at various positions. The term "airbag" is sometimes used to refer to impact protection devices that are deployed to protect the head or upper body portion of a passenger in a vehicle. As used herein, the term airbag is not so limited and includes impact protection devices positioned to provide protection to a passenger where the passenger's body makes contact in the event of a crash, such as the steering wheel, steering column, head set, dashboard, side support structures, head rests, door panels, and similar positions in rear seats of vehicles to provide further protection to passengers of the vehicle. The airbags can protect not only the passenger's head and upper body, but also the torso, side, or other parts of the passenger's body. The use of NPR materials in airbags positioned throughout a vehicle provide support and impact absorption to a passenger in the case of a crash.

Airbags generally operate by quickly inflating and then releasing when an impact is detected. The quick inflation of the airbag protects the person that is seated in front of the airbag from being thrown against structures in the car, such as the steering wheel or dashboard. The first and second airbags 102, 104 are formed using negative Poisson's ratio ("NPR") materials.

NPR materials have material characteristics and behaviors that are the opposite of PPR materials under application of mechanical, electromagnetic, light, thermal, and energy forces. An object with a negative Poisson's ratio is an object that has a Poisson's ratio that is less than zero, such that when the object experiences a positive strain along one axis (e.g., when the object is stretched), the strain in the object along the two perpendicular axes is also positive (e.g., the object expands in cross-section). Conversely, when the object experiences a negative strain along one axis (e.g., when the object is compressed), the strain in the object along a perpendicular axis is also negative (e.g., the object compresses along the perpendicular axis). By contrast, an object with a positive Poisson's ratio (PPR) has a Poisson's ratio that is greater than zero. When an object with a PPR experiences a positive strain along one axis (e.g., when the object is stretched), the strain in the object along the two perpendicular axes is negative (e.g., the object compresses in cross-section), and vice versa. NPR materials provide enhanced energy absorption compared to PPR material when used in airbags.

NPR materials can be combined with PPR materials to form "Boolean-Park" materials ("B-P" materials). Because of the NPR material behavior, the use of B-P materials can provide better absorption of forces on the airbag to reduce the forces felt by the passengers of a vehicle.

Referring now to FIG. 1B, an airbag system 101 includes an airbag 102, propellant or expansion canister 120, computer 122, and sensor 123. As described above, one or more sensors 123 on or in the vehicle can detect a crash or impact has occurred and transmit a signal to the computer 122. The sensor 123 can be an electromagnetic sensor, acceleration sensor, load sensor, or other type of sensor. The sensors 123 can provide a signal to the computer 122 representing impact conditions. Responsive to receiving the signal, the computer 122 triggers the canister 120 to inflate or expand the airbag 102. The canister 120 can include gas or fluid, chemicals that combine to produce an expanding gas or fluid, or other inflating compounds and mechanisms. When the canister 120 is triggered, the airbag 102 is expanded from a non-deployed state (e.g., the airbag is folded within a compartment of the dashboard or steering wheel) to a deployed state by quickly filling the airbag 102 with a fluid, gas, or other compound. The computer can trigger the inflation of the airbag 102 under pre-programmed conditions.

The airbag 102 is a shell formed at least in part from an NPR material, which is filled with the fluid or gas when the airbag 102 is inflated and deployed. Cross section 124 shows a section of the airbag 102 shell made from a textile formed from an NPR material 128. In an embodiment, the textile is formed from an NPR material 128, the NPR material 128 having a Poisson's Ration of between 0 and −1. In another embodiment, the textile is formed from a combination of an NPR material 128 and a PPR material 130. In some embodiments, the textile is formed from a combination of fibers of the NPR material 128 and fibers of the PPR material 130 woven together. The interior 129 of the airbag 102 is formed from an NPR material, a PPR material, or a combination of NPR and PPR materials. In some implementations, the interior 129 is not filled with any material when the airbag 102 is in the deflated state, and is filled with a fluid or gas to inflate the airbag 102 responsive to sensing of an impact. In some implementations, the interior 129 is formed from a cellular matrix incorporating an NPR material, and the cells of the cellular matrix are permeated by the fluid or gas to expand the airbag 102. In some implementations, the cellular matrix incorporates both an NPR material and a PPR material. For example, the cellular matrix can have the re-entrant cell structure described below in FIG. 3A.

Cross section 126 shows a second embodiment of the airbag 102 shell made from a printed material formed from an NPR material 132. In an embodiment, the printed material is formed from an NPR material 132, the NPR material 132 having a Poisson's Ratio of between 0 and −1. In another embodiment, the printed material is formed from a combination of an NPR material 132 and a PPR material 134. In some embodiments, the printed material is formed from a combination of the NPR material 132 and the PPR material 134 distributed as layers or with the NPR material 132 embedded within the PPR material 134. The printed material forming the airbag 102 shell can include alternating layers of NPR materials 132 and PPR materials 134. The alternating layers of NPR materials 132 and PPR materials 134 can be arranged so that the layers are perpendicular or angled to an outside edge of the airbag 102 shell, or in some embodiments the alternating layers of NPR materials 132 and PPR materials 134 can be arranged so that an NPR material 132 forms the outer layer at the airbag 102 shell, with alternating layers of PPR material 134 and NPR material 132 beneath the outer layer. The NPR material 132 outer layer absorbs energy from an impact of a passenger against the airbag 102 shell, and further energy that is not absorbed can be propagated into the underlying layers which also absorb components of the force of the impact. The interior 131 of the airbag 102 is formed from an NPR material, a PPR material, or a combination of NPR and PPR materials. In some implementations, the interior 131 is not filled with any material, and is filled with a fluid or gas to inflate the airbag 102. In some implementations, the interior 131 is formed from a cellular matrix incorporating an NPR material, and the cells of the cellular matrix are permeated by the fluid or gas to expand the airbag 102. In some implementations, the cellular matrix incorporates an NPR material and a PPR material.

The NPR materials can be created by arranging nano- or micro-spheres or sponges of positive PPR material in a particular configuration so that the spheres or sponges behave as NPR materials. The combination of the NPR materials with PPR materials forms B-P materials, which can be advantageously applied in airbags and other impact protection devices, as shown in the cross-sections 124 and 126 of FIG. 1B. B-P materials have a lower density, better strength-to-weight ratio, greater porosity, larger surface area, and better dimensional stability than conventional materials. Further, the use of B-P materials in airbags and other impact protection devices is more efficient than use of conventional materials because a smaller amount of material can be used in the manufacturing process.

In some implementations, the airbag 102 shell or interior material is formed as a cell-structure or lattice including the NPR material 132, or the NPR material 132 in combination with the PPR material 134. In some implementations, components of the airbag 102 shell are formed of an NPR composite material that includes both an NPR material (e.g., an NPR foam material) and a PPR material, e.g., alternating layers of NPR material and PPR material (as illustrated in FIG. 1B cross section 126), or a matrix of PPR material with NPR material embedded therein, or a matrix of NPR material with PPR material embedded therein.

In some implementations, the airbags 102 and 104 are formed as an inflatable shell formed of an NPR material, PPR material, or combination of NPR and PPR materials. The airbags 102 and 104 include a cellular matrix formed at least in part from an NPR materials positioned within the inflatable shell. In some implementations, the cellular matrix expands from a constricted state to an expanded state in response to a stimuli or in response to the inflatable shell being inflated.

NPR materials have a lower density than PPR materials, e.g., than PPR materials of a similar composition or than PPR materials having similar mechanical properties, and airbags including NPR materials can thus be lighter in weight and use less material than similar objects formed of PPR materials.

In some implementations, at least a portion of the airbag 102 shell is formed as a textile including an NPR material 128 as described above, and at least a portion of the airbag 102 shell is formed as a printed material (e.g., a 3-D printed material) including an NPR material 132 as also described above. In some implementations, the airbag 102 shell contains only one of a textile or a printed material formed from an NPR material.

In an embodiment, the first and second airbags 102, 104 are formed as an inflatable shell of the NPR material which is inflated upon impact, as illustrated in FIG. 1B. The NPR material in the inflatable shell is impacted by a human passenger of the vehicle during or immediately after the impact, and the force of the human passenger's impact to the inflatable shell is absorbed by the NPR material so as to lessen the force felt by the human passenger and prevent injury. The inflatable shell can then slowly deflate after the impact to provide space for the human passenger.

In another embodiment, the first and second airbags 102, 104 are formed as a cushion of the NPR material which is exposed to the human passenger upon impact. The NPR material in the cushion is impacted by a human passenger of the vehicle during or immediately after the impact, and the force of the human passenger's impact to the cushion is absorbed by the NPR material so as to lessen the force felt by the human passenger and prevent injury. In such embodiments, the cushion can be further expanded by inflation or can be non-inflated.

The first and second airbags 102, 104 absorb the impact energy of the passenger without causing injury to the passenger. While conventional airbags can sometime expand too quickly or can expand when no force is detected and can cause harm to passengers in the vehicle, the first and second airbags 102, 104 formed from NPR materials can better absorb the energy of the passenger being moved through the vehicle to protect the passenger. The NPR material airbags 102, 104 can lower the initial contact stress when the passenger first contacts the airbag, thereby reducing the incidence of sudden contact injury. Because the NPR material deforms more easily than conventional non-NPR materials, the airbags are less likely to cause harm to the passenger. Additionally, the NPR material airbags are resistant to rupture. When conventional airbags rupture, they can expose the passenger to chemicals and materials that are within the airbag for inflation purposes and can cause injury or illness to the passenger.

In some embodiments, airbags as described above can be used on the exterior of a vehicle to protect pedestrians, structures, animals, or the car itself from impact in the case of a crash.

The greater absorption of stresses by the NPR material used in the airbags described above can be useful in various other impact protection devices, such as helmets, and impact vests or flotation devices.

Figure 2A:
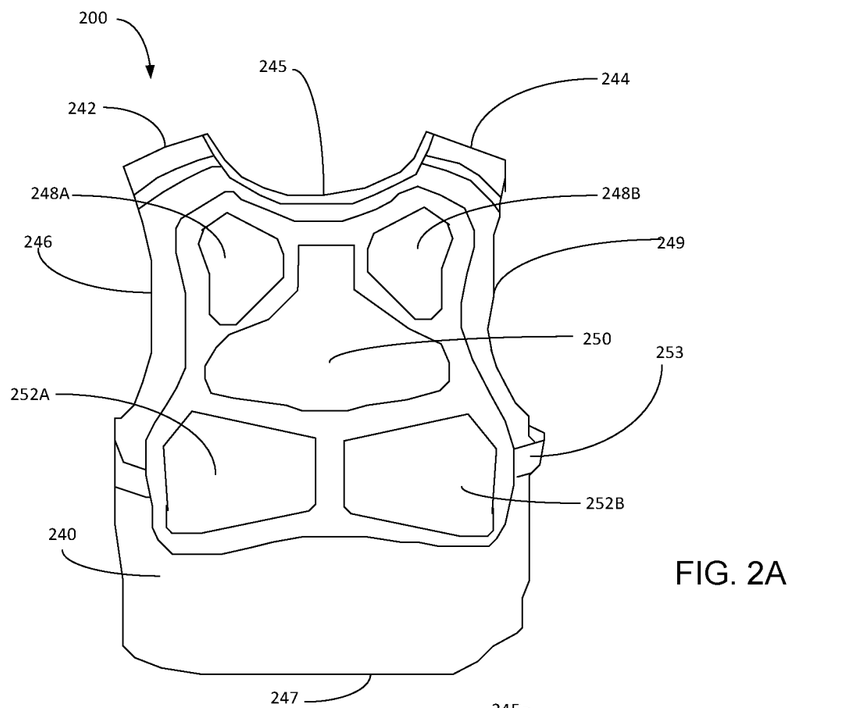
FIGS. 2A-2B are illustrations of front and back perspectives of a vest for impact protection.
Figure 2B:
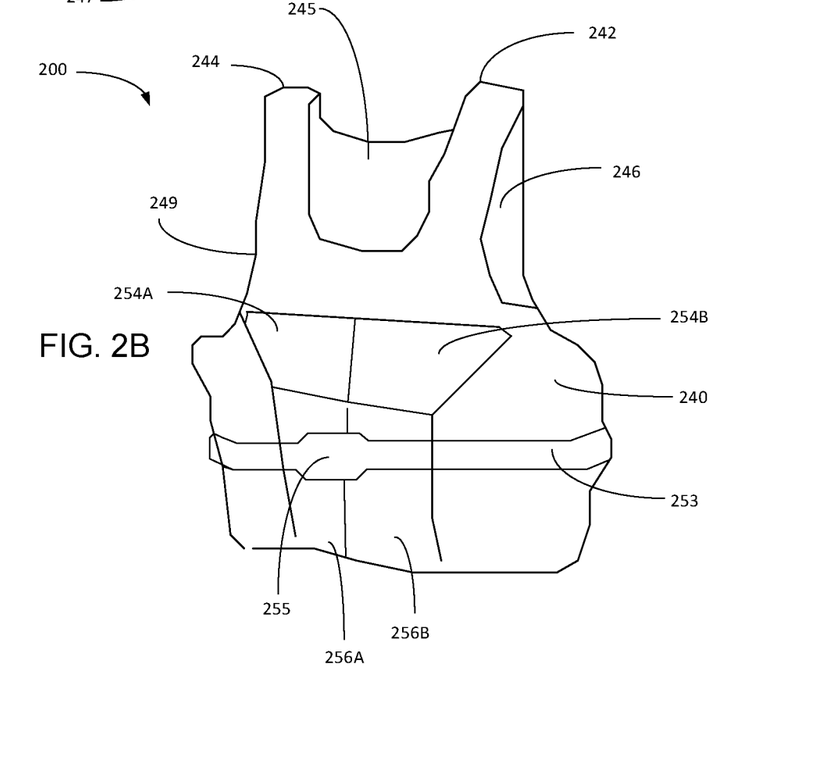

FIGS. 2A-B illustrate an example impact vest formed with NPR materials. The impact vest 200 has a front side (FIG. 2B) and back side (FIG. 2A). The impact vest 200 includes a vest body 240, first shoulder strap 242 and second shoulder strap 244. The impact vest 200 defines an aperture 245 sized to accommodate a wearer's head, and apertures 246 and 249 to accommodate the wearer's arms when the wearer is wearing the impact vest 200. A bottom portion 247 of the vest body 240 is open to allow the wearer's legs and lower body to extend through. The vest body 240 includes multiple cushions positioned on the vest body 240, including first and second upper chest cushions 254A-B and first and second lower chest cushions 256A-B on a front side of the vest body 240 (illustrated in FIG. 2B), and first and second upper back cushions 248A-B, central back cushion 250, and first and second lower back cushions 252A-B on a back side of the vest body 240 (illustrated in FIG. 2A). The vest body 240 is meant to be worn closely to a body of a human user, so as to at least partially absorb forces impacting the vest body 240 to lessen the forces felt by the human user as a result of an impact.

The cushions 254A-B, 256A-B, 250, 248A-B, and 252A-B are formed at least in part from an NPR material. The NPR material of the cushions absorbs the energy of an impact at the vest body 240 so that the full impact force is not felt on the body of the wearer of the impact vest 200. The NPR material can be formed from one or more types of fibers, such as polyamide fibers or PET fibers. The NPR materials forming the cushions can be 3-D printed as a matrix of cells, an open-celled foam, or a closed-cell foam. When the impact vest is subject to an impact, for example when a user falls or jumps into a body of water or an object or projectile hits the impact vest, the NPR materials in the cushions deform and, as a result, absorb some of the energy associated with the impact. The absorption of the impact energy at the cushions prevents the full force of the impact from being felt at the skin of the user, and the presence of the multiple cushions positioned on the impact vest 200 also serve to displace the impact force over the surface area of the vest to further protect the wearer.

In some implementations, the cushions can be formed from a combination of the NPR material and a PPR material. In some implementations, the cushions are formed from fibers of the NPR material and PPR material. In some implementations, the fibers include polyamide fibers including nylon 6,6, or polyester fibers, including PET, polyethylene terephthalate. In some implementations, the cushions are formed from a matrix of NPR and PPR materials. In some implementations, the NPR materials are embedded in a matrix of PPR materials. In some implementations, the NPR materials form a matrix in which the PPR materials are embedded. In some implementations, the cushions are formed from a material having cells of the NPR materials and cells of the PPR materials, with the NPR material cells interspersed among the PPR material cells. In some implementations, the PPR material cells and NPR material cells are formed as a 3-D printed foam material. In some implementations, the cushions are formed from alternating layers of PPR materials and NPR materials. The outermost layer of a cushion can be formed from the NPR material, with a layer of the PPR material formed beneath. In some implementations, the layers of PPR and NPR materials are formed within the cushion so that the boundaries of the layers are orthogonal to the outermost surface of the cushion.

The combination of the NPR material and PPR material forms a B-P material. B-P materials have a lower density, better strength-to-weight ratio, greater porosity, larger surface area, and better dimensional stability than conventional materials. Further, the use of B-P materials in airbags and other impact protection devices is more efficient than use of conventional materials because a smaller amount of material can be used in the manufacturing process.

Impact vests 200 can be used by a wearer engaging in various water-based activities and sports, such as kite surfing, wind surfing, water skiing, jet skiing, surfing, and cliff diving. Impact vests 200 used for such activities can incorporate additional cushions that serve to add flotation to the impact vest 200 so that the vest functions to protect against impacts and to provide flotation in the water. Impact vests 200 can also be used in non-water based activities, such as playing paintball or airsoft games, grappling, martial arts, baseball, military operations, or other activities. Impact vests 200 can also be designed for non-human users, including for dogs, horses, or other animals.

The impact vest 200 includes a belt strap 253, with a buckle 255. The belt strap 253 wraps around the impact vest 200 from the back to the front and buckles at the buckle 255 at the front of the impact vest 200. In some implementations, additional belts or buckles are also included on the impact vest 200 to allow the wearer to fit the impact vest 200 more closely to their body, and to prevent the impact vest 200 from falling off. For example, in some implementations, the first and second shoulder straps 242 and 244 are adjustable. In some implementations, the impact vest 200 also includes a strap from the front of the vest to the back of the vest that is meant to pass between the wearer's legs, to keep the impact vest attached when the wearer is in the water.

In some implementations, the impact vest 200 includes one or more cushions 254A-B, 256A-B, 250, 248A-B, and 252A-B which can be deployed from a non-expanded state to an inflated state upon detection of water to provide additional flotation to a wearer. Such an impact vest 200 can include sensors to detect water coupled to inflation mechanisms to inflate the cushions. As described above, the inflation mechanism can be can be a property of one or more cushion materials in response to contacting water, a reservoir filled with a gas or liquid, one or more chemicals that expand when combined with air, water or one another, a fluid source, a chemical explosive, a pump, or another mechanism that operates to inflate the cushions of the vest 200. The impact vest 200 can be used to provide safe and non-bulky flotation for infants, children, or other individuals who may need additional floatation in water environments.

Figures 3A, 3B:
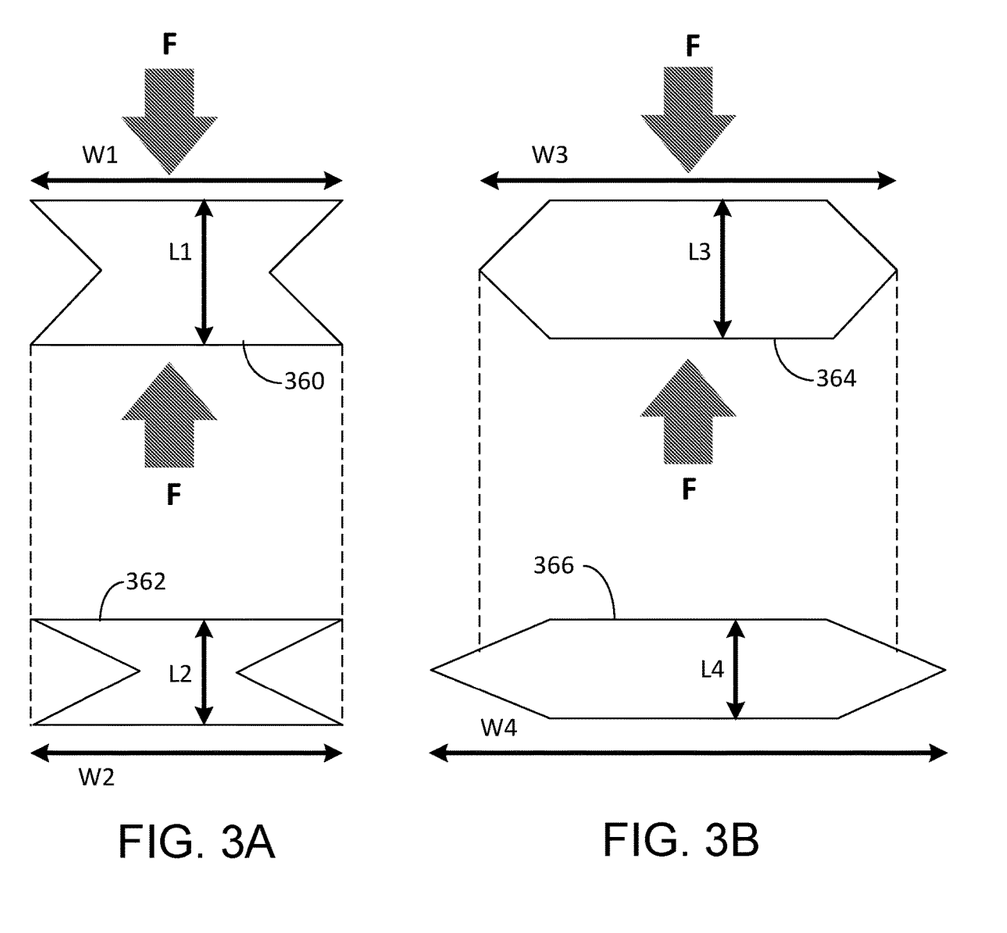
FIGS. 3A-3B are illustrations of materials with negative and positive Poisson's ratios.

The NPR material airbags 102, 104 and NPR material impact vest 200 use NPR materials to provide protection to a human being against injuries resulting from impact forces. The NPR materials absorb energy upon impact, adding to the energy absorption provided by inflation of a cushion or shell, or simply lessening the impact felt by the wearer. The NPR material used in the first and second airbags 102, 104 or the impact vest 200 is capable of absorbing stress without lateral deformation. FIG. 3A illustrates the deformation of the NPR material compared to a non-NPR material when a force is applied.

Materials with negative and positive Poisson's ratios are illustrated in FIGS. 3A and 3B. FIG. 3A depicts a hypothetical two-dimensional block 360 of NPR material with length L1 and W1 in a non-stressed state. The FIG. 3A structure is called a "re-entrant cell." When the block 360 is compressed along its length by the application of force F, the material deforms into the shape shown as block 362. The length L2 of block 362 is less than the length L1 of block 360, but the width W2 of block 362 is the same as the width W1 of block 360. The NPR material block 360 compresses along the length, and remains constant in width.

FIG. 3B depicts a hypothetical two-dimensional block 364 of PPR material with length L3 and W3 in a non-stressed state. In contrast to the NPR block 360 of FIG. 3A, when the PPR block 364 is compressed along its length by the application of force F, the material deforms into the shape shown as block 366. The length L4 of block 366 is less than the length L3 of block 364, but the width W4 of block 366 is the greater than the width W3 of block 364: the material compresses along its width and expands along its length.

The dimensional changes to the NPR material, such as the lateral deformation depicted in FIG. 3A, take place due to the absorption of mechanical, thermal, electromagnetic, or ultraviolet energy, which is absorbed at a higher rate than in non-NPR or PPR materials. The NPR material used to form the airbags (such as airbags 102 and 104 in FIG. 1A), impact vests (such as impact vest 240 in FIGS. 2A-B), and other impact protection devices described above can be produced by a variety of mechanisms, including molding and 3-D manufacturing.

The NPR material used for airbags (such as airbags 102 and 104 in FIG. 1A) or impact vests (such as impact vest 240 in FIGS. 2A-B) can be NPR fibers, such as polyamide fibers including nylon 6,6, or polyester fibers, including PET, polyethylene terephthalate. NPR fibers can be used in combination with PPR fibers to produce materials for use in the impact protection devices. The NPR fibers and materials can have a Poisson's ratio of between −1 and 0, e.g., between −0.8 and 0, e.g., −0.8, −0.7, −0.6, −0.5, −0.4, −0.3, −0.2, or −0.1. NPR materials can have an isotropic Poisson's ratio (e.g., Poisson's ratio is the same in all directions) or an anisotropic Poisson's ratio (e.g., Poisson's ratio when the material is strained in one direction differs from Poisson's ratio when the material is strained in a different direction).

NPR materials for insulators can be foams, such as polymeric foams, ceramic foams, metal foams, or combinations thereof. A foam is a multi-phase composite material in which one phase is gaseous and the one or more other phases are solid (e.g., polymeric, ceramic, or metal). Foams can be closed-cell foams, in which each gaseous cell is sealed by solid material; open-cell foams, in which the each cell communicates with the outside atmosphere; or mixed, in which some cells are closed and some cells are open.

An NPR foam can be polydisperse (e.g., the cells of the foam are not all of the same size) and disordered (e.g., the cells of the foam are randomly arranged, as opposed to being arranged in a regular lattice). An NPR foam can be a cellular structure having a characteristic dimension (e.g., the size of a representative cell, such as the width of the cell from one wall to the opposing wall) ranging from 0.1 µm to about 3 mm, e.g., about 0.1 µm, about 0.5 µm, about 1 µm, about 10 µm, about 50 µm, about 100 µm, about 500 µm, about 1 mm, about 2 mm, or about 3 mm.

In some examples, NPR foams are produced by transformation of PPR foams to change the structure of the foam into a structure that exhibits a negative Poisson's ratio. In some examples, NPR foams are produced by transformation of nanostructured or microstructured PPR materials, such as nanospheres, microspheres, nanotubes, microtubes, or other nano- or micro-structured materials, into a foam structure that exhibits a negative Poisson's ratio. The transformation of a PPR foam or a nanostructured or microstructured material into an NPR foam can involve thermal treatment (e.g., heating, cooling, or both), application of pressure, or a combination thereof. In some examples, PPR materials, such as PPR foams or nanostructured or microstructured PPR materials, are transformed into NPR materials by chemical processes, e.g., by using glue. In some examples, NPR materials are fabricated using micromachining or lithographic techniques, e.g., by laser micromachining or lithographic patterning of thin layers of material. In some examples, NPR materials are fabricated by additive manufacturing (e.g., three-dimensional (3D) printing) techniques, such as stereolithography, selective laser sintering, or other appropriate additive manufacturing technique.

In an example, a PPR thermoplastic foam, such as an elastomeric silicone film, can be transformed into an NPR foam by compressing the PPR foam, heating the compressed foam to a temperature above its softening point, and cooling the compressed foam. In an example, a PPR foam composed of a ductile metal can be transformed into an NPR foam by uniaxially compressing the PPR foam until the foam yields, followed by uniaxially compression in other directions.

In some examples, NPR foams are produced by transformation of PPR foams to change the structure of the foam into a structure that exhibits a negative Poisson's ratio. In some examples, NPR foams are produced by transformation of nanostructured or microstructured PPR materials, such as nanospheres, microspheres, nanotubes, microtubes, or other nano- or micro-structured materials, into a foam structure that exhibits a negative Poisson's ratio. The transformation of a PPR foam or a nanostructured or microstructured material into an NPR foam can involve thermal treatment (e.g., heating, cooling, or both), application of pressure, or a combination thereof. In some examples, PPR materials, such as PPR foams or nanostructured or microstructured PPR materials, are transformed into NPR materials by chemical processes, e.g., by using glue. In some examples, NPR materials are fabricated using micromachining or lithographic techniques, e.g., by laser micromachining or lithographic patterning of thin layers of material. In some examples, NPR materials are fabricated by additive manufacturing (e.g., three-dimensional (3D) printing) techniques, such as stereolithography, selective laser sintering, or other appropriate additive manufacturing technique.

In an example, a PPR thermoplastic foam, such as an elastomeric silicone film, can be transformed into an NPR foam by compressing the PPR foam, heating the compressed foam to a temperature above its softening point, and cooling the compressed foam. In an example, a PPR foam composed of a ductile metal can be transformed into an NPR foam by uniaxially compressing the PPR foam until the foam yields, followed by uniaxially compression in other directions.

NPR-PPR composite materials are composites that include both regions of NPR material and regions of PPR material. NPR-PPR composite materials can be laminar composites, matrix composites (e.g., metal matrix composites, polymer matrix composites, or ceramic matrix composites), particulate reinforced composites, fiber reinforced composites, or other types of composite materials. In some examples, the NPR material is the matrix phase of the composite and the PPR material is the reinforcement phase, e.g., the particulate phase or fiber phase. In some examples, the PPR material is the matrix phase of the composite and the NPR material is the reinforcement phase.

NPR materials can exhibit various desirable properties, including high shear modulus, effective energy absorption, and high toughness (e.g., high resistance to indentation, high fracture toughness), among others. The properties of NPR materials are such that an item that includes an NPR material undergoes a different (e.g., smaller) change in dimension when absorbing energy than a comparable item formed of only PPR material.

Figure 4:
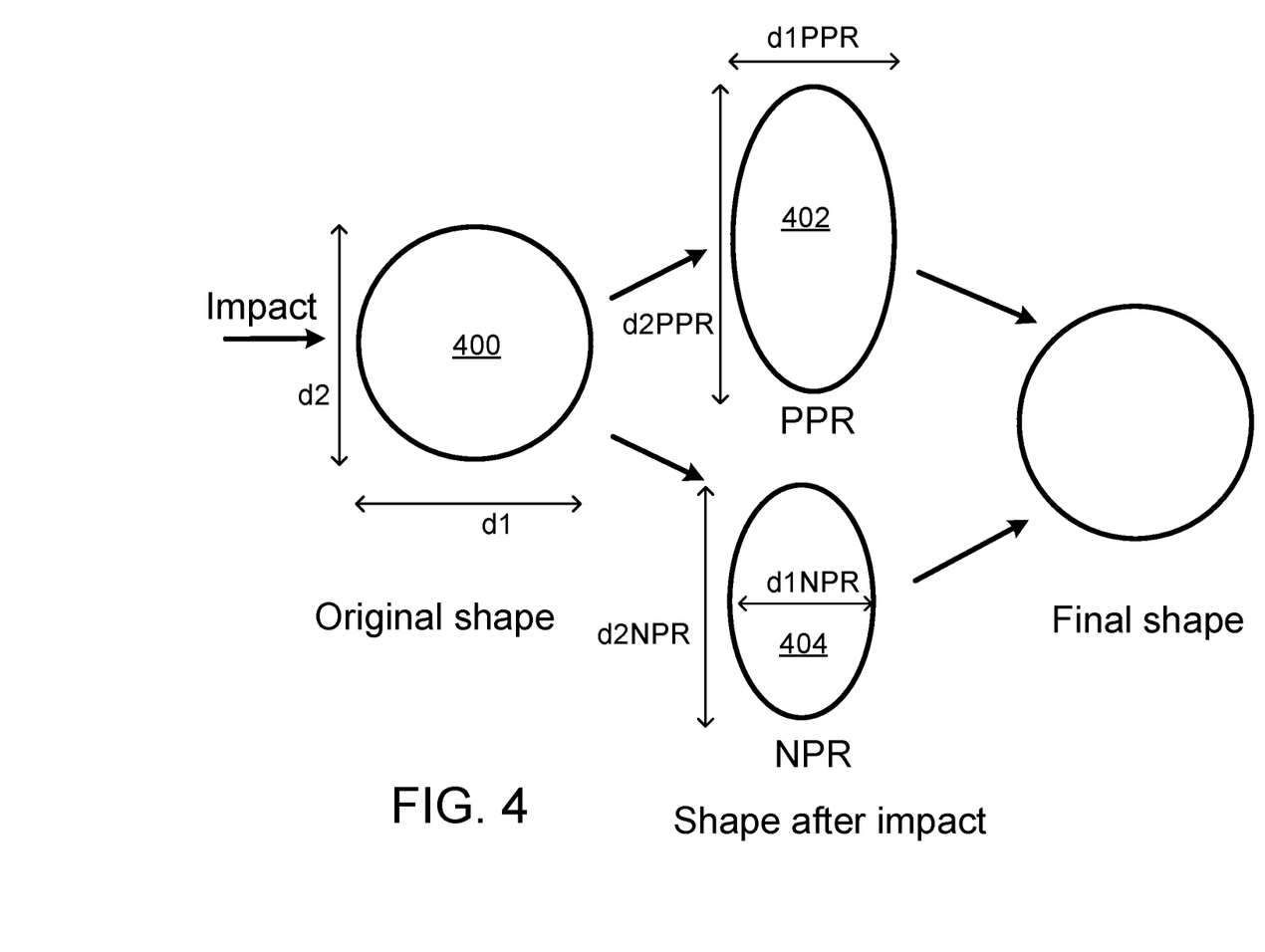
FIG. 4 is an illustration of balls with negative and positive Poisson's ratios.

FIG. 4 shows a schematic depiction of the change in diameter of a material 400 upon impact. Although the material 400 in FIG. 6 is shown as a rounded ball, a similar deformation occurs in materials of other shapes. Prior to impact, the material 400 has a diameter d1 in the direction of the impact and a diameter d2 in the direction perpendicular to the impact. If the material 400 is a PPR material, the material undergoes significant deformation (e.g., elastic deformation) into a shape 402, such that the diameter in the direction of the impact decreases to d1PPR and the diameter in the direction perpendicular to the impact increases to d2PPR. By contrast, if the material 400 is an NPR material, the material undergoes less extensive deformation into a shape 404. The diameter of the shape 404 in the direction of the impact decreases to d1NPR, which is approximately the same as d1PPR. However, the diameter of the shape 404 in the direction perpendicular to the impact also decrease, to d2NPR. The magnitude of the difference between d2 and d2NPR is less than the magnitude of the difference between d2 and d2PPR, meaning that the NPR material undergoes less deformation than the PPR ball.

Figure 5A:
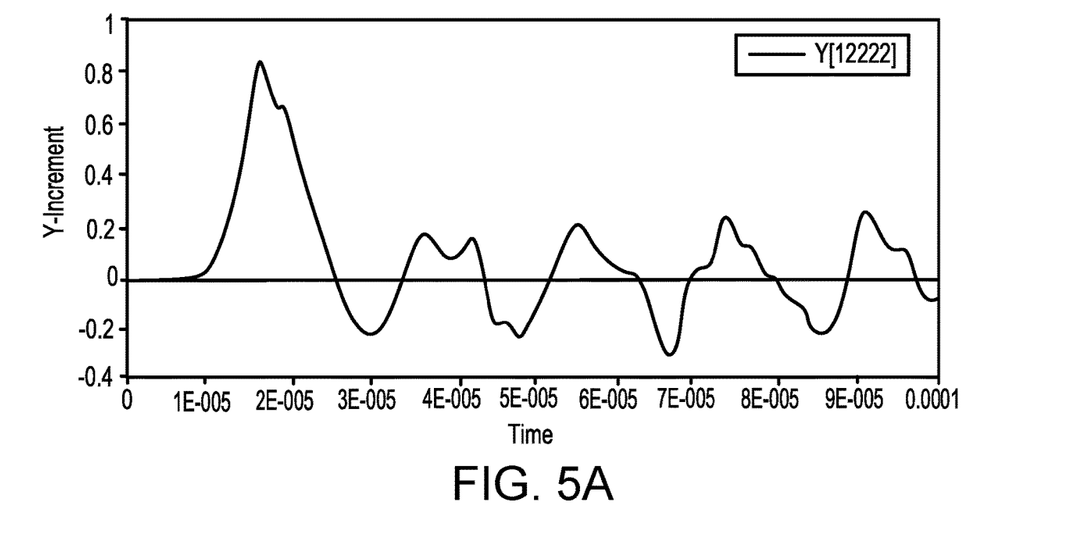
FIGS. 5A and 5B are plots of diameter versus time.
Figure 5B:
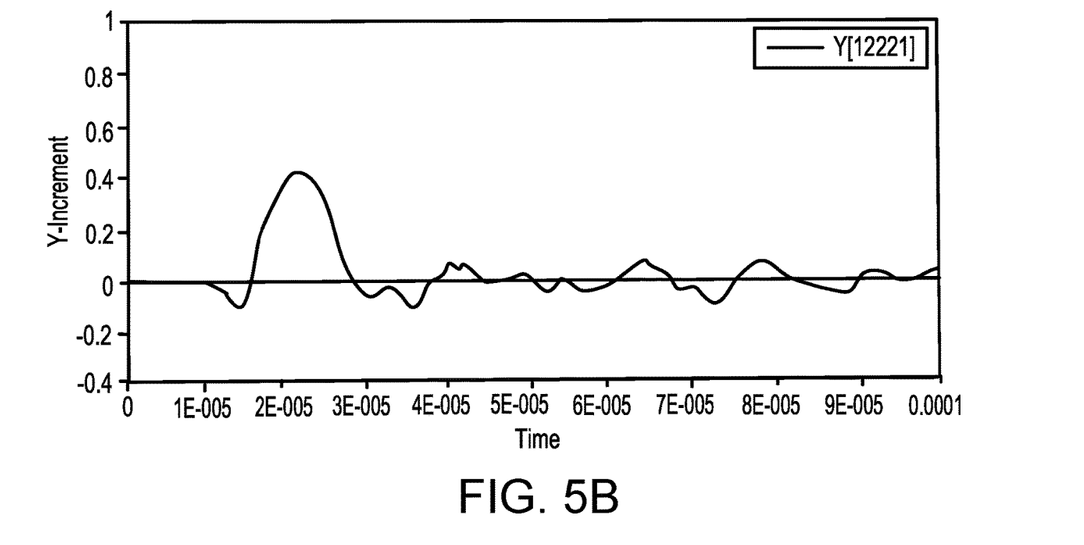

FIGS. 5A and 5B show plots of diameter versus time for a substantially spherical PPR material with a Poisson's ratio of 0.45 and an NPR material with a Poisson's ratio of −0.45, respectively, responsive to being struck with an equivalent force. In this example, the NPR material undergoes a smaller initial change in diameter than does the PPR material, and the oscillations in diameter are smaller in magnitude and dampen more quickly. Again, although FIGS. 5A and 5B are specific to substantially spherical materials, a similar behavior occurs in NPR and PPR materials of other shapes. The material of an insulator can be selected to balance rigidity and elasticity.

Figure 6:
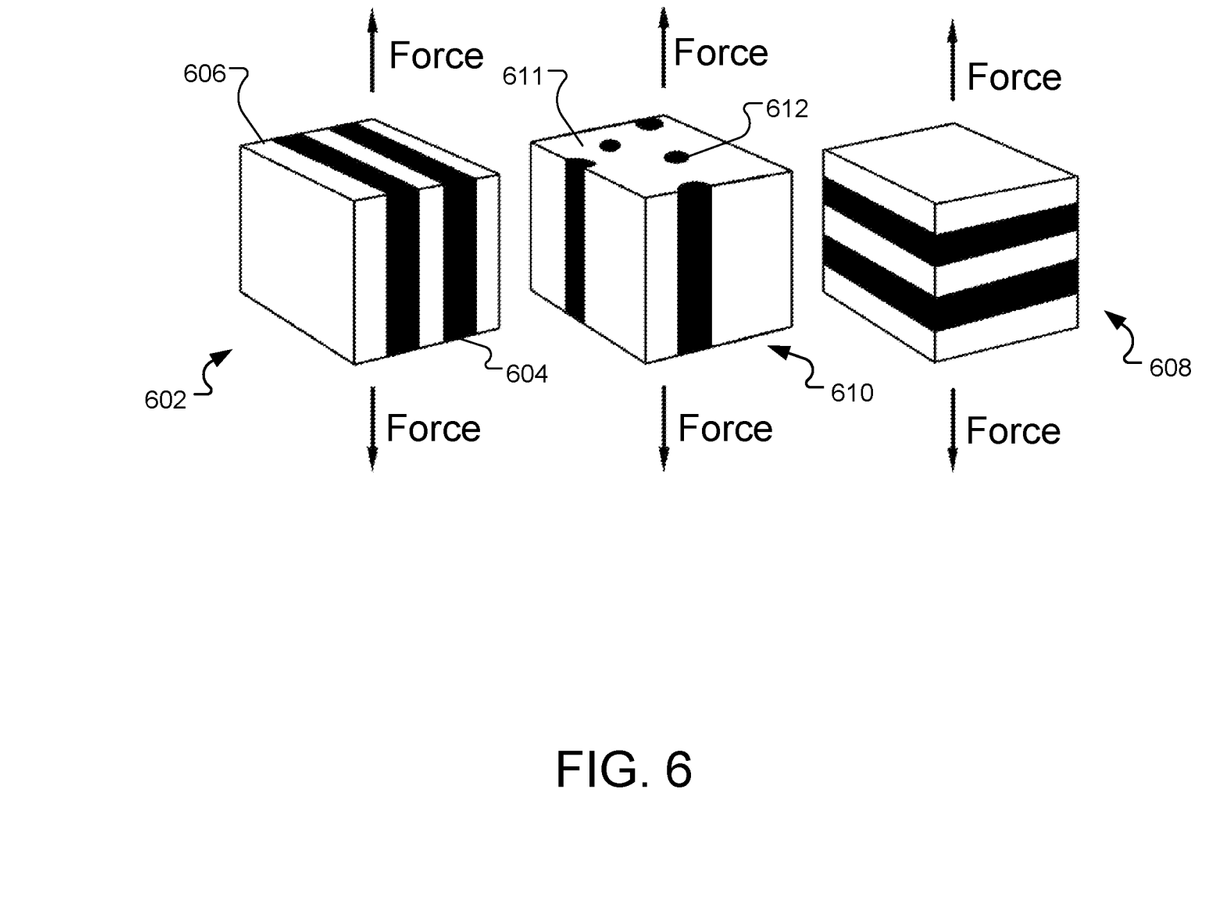
FIG. 6 is an illustration of composite materials.

FIG. 6 illustrates examples of NPR-PPR composite materials. An NPR-PPR composite material 602 is a laminar composite including alternating layers 604 of NPR material and layers 605 of PPR material. The layers 604, 606 are arranged in parallel to a force to be exerted on the composite material 602. Although the layers 604, 606 are shown as having equal width, in some examples, a laminar composite can have layers of different widths.

An NPR-PPR composite material 608 is a laminar composite including alternating layers of NPR material and PPR material, with the layers arranged perpendicular to a force to be exerted on the material 608. In some examples, the layers of a laminar composite are arranged at an angle to the expected force that is neither perpendicular nor parallel.

An NPR-PPR composite material 612 is a matrix composite including a matrix phase 611 of NPR material with a reinforcement phase 612 of PPR material. In the material 612, the reinforcement phase 612 includes fibers of the PPR material; in some examples, the reinforcement phase 612 can include particles or other configuration. In some examples, NPR-PPR composite materials can have a matrix phase of a PPR material with a reinforcement phase of an NPR material.

Figure 7:
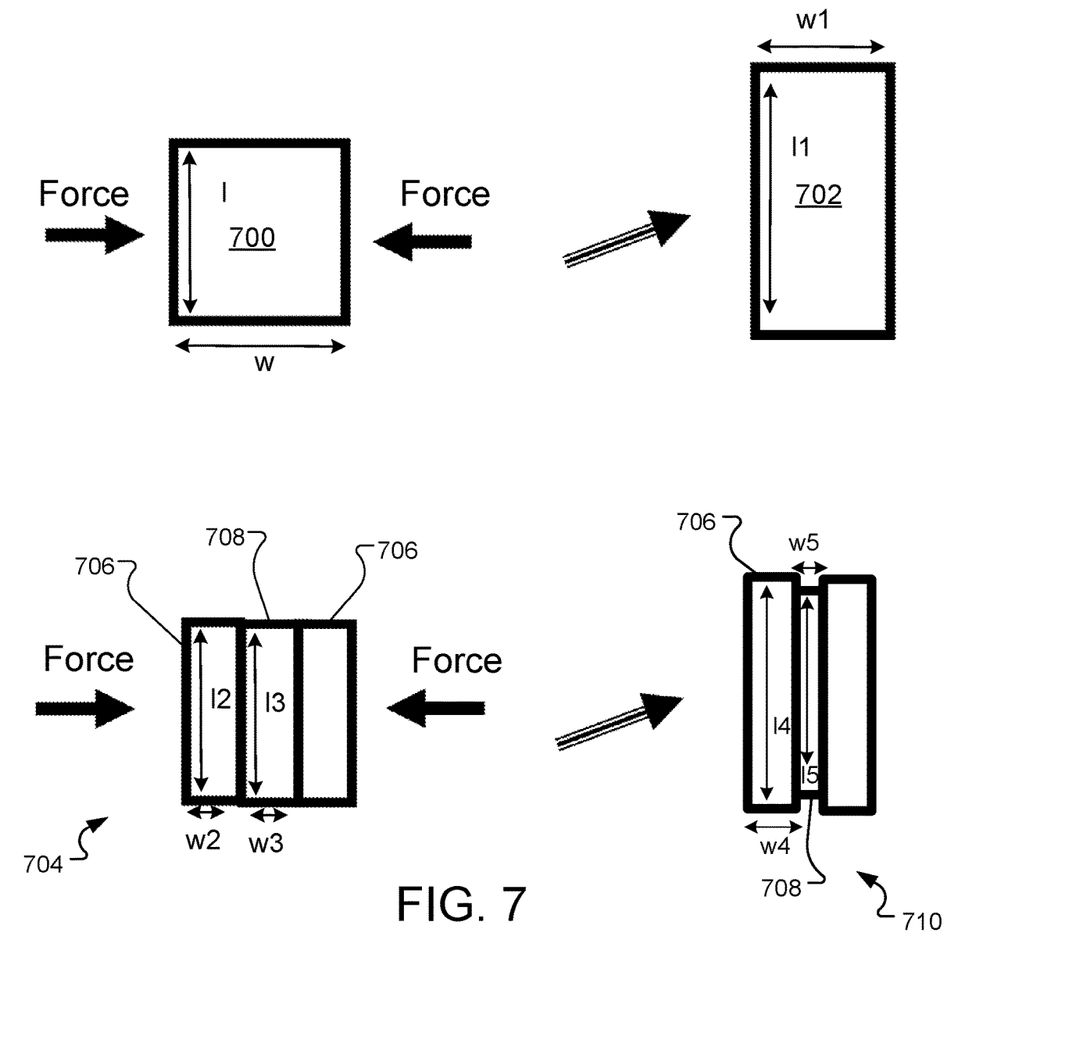
FIG. 7 is an illustration of a material with a positive Poisson's ratio and a composite material.

FIG. 7 illustrates the mechanical behavior of PPR and NPR/PPR composite materials. A hypothetical block 700 of PPR material, when compressed along its width w, deforms into a shape 702. The width w1 of the compressed block 702 is less than the width w of the uncompressed block 700, and the length l1 of the compressed block 702 is greater than the length l of the uncompressed block: the material compresses along the axis to which the compressive force is applied and expands along a perpendicular axis.

A block 704 of NPR/PPR composite material includes a region 708 of NPR material sandwiched between two regions 706 of PPR material. When the block 704 of composite material is compressed along its width, the material deforms into a shape 710. The PPR regions 706 compress along the axis of compression and expand along a perpendicular axis, e.g., as described above for the block 700 of PPR material, such that, e.g., the width w2 of a region 706 of uncompressed PPR material compresses to a smaller width w4 and the length l2 of the region 706 expands to a greater length l4. In contrast, the NPR region 708 compresses along both the axis of compression and along the perpendicular axis, such that, e.g., both the width w3 and length l3 of the uncompressed NPR region 708 are greater than the width w5 and length l5 of the compressed NPR region 708.

Figure 8:
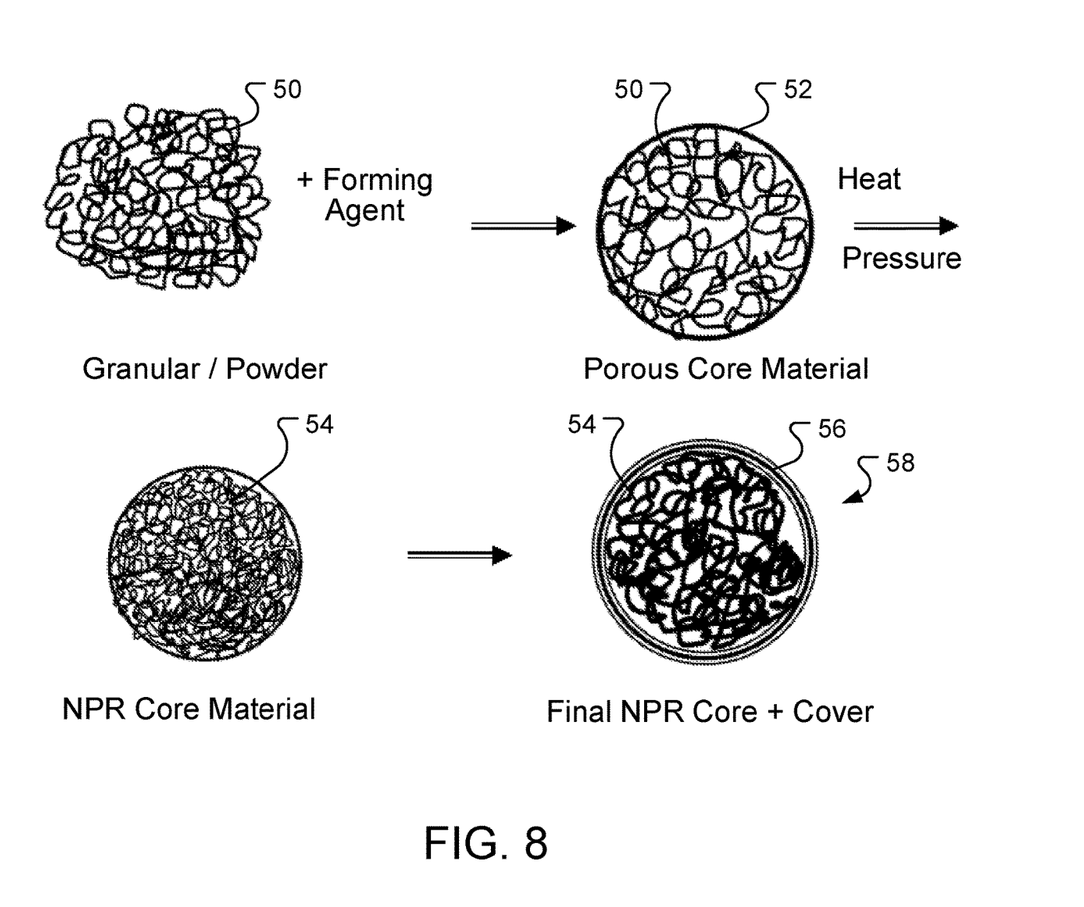
FIG. 8 is an illustration of a method of making an NPR material.

FIG. 8 illustrates an example method of making an object, such as casing, window, or other object, formed of an NPR material. A granular or powdered material, such as a polymer material (e.g., a rubber) is mixed with a foaming agent to form a porous material 50. The porous material 50 is placed into a mold 52. Pressure is applied to compress the material 50 and the compressed material is heated to a temperature above its softening point. The material is then allowed to cool, resulting in an NPR foam 54. The NPR foam 54 is covered with an outer layer 56, such as a polymer layer, and heat and pressure is applied again to cure the final material into an object 58.

In some examples, a material can be formed into an NPR material by forming nanoscale or microscale structures, such as spheres or tubules, with the material.

Other methods can also be used to fabricate an object formed of an NPR material or an NPR-PPR composite material. For example, various additive manufacturing (e.g., 3D printing) techniques, such as stereolithography, selective laser sintering, or other appropriate additive manufacturing technique, can be implemented to fabricate an object formed of an NPR material or an NPR-PPR composite. In some examples, different components of the object are made by different techniques. For example, an inner layer may be 3D printed while the out layer is not, or vice versa. Additive manufacturing techniques can enable seams to be eliminated.

Other embodiments are within the scope of the following claims.

What is claimed is:

1. An impact protection system comprising:
    an airbag comprising a first material having a negative Poisson's ratio and a second material having a positive Poisson's ratio; and
    an expulsion source coupled to the airbag and configured to expand the airbag from a constricted state to a deployed state in response to detection of an impact.

2. The impact protection system of claim 1, wherein the first material and the second material comprises fibers.

3. The impact protection system of claim 2, wherein at least a subset of the fibers comprise polyamide or polyester.

4. The impact protection system of claim 1, wherein the airbag comprises a matrix of cells of the first material and cells of the second material.

5. The impact protection system of claim 4, wherein the cells of the first material are interspersed with the cells of the second material.

6. The impact protection system of claim 4, wherein the cells of the first material and the cells of the second material comprise 3-D printed cells.

7. The impact protection system of claim 6, wherein the cells of the first material and the cells of the second material comprise a 3-D printed foam material.

8. The impact protection system of claim 1, wherein the airbag comprises alternating layers of the first material and the second material, an outer layer of the airbag comprising the first material.

9. The impact protection system of claim 1, further comprising a sensor coupled to the expulsion source, the sensor configured to:
    detect an impact; and
    provide a signal to the expulsion source to release the airbag from the constricted state.

10. An impact vest comprising:
    a vest body including a front and a back, the vest body comprising a first material having a negative Poisson's ratio and a second material having a positive Poisson's ratio, the first and second materials arranged in alternating layers, wherein the impact vest is configured to protect a subject wearing the vest body by at least partially absorbing a force associated with an impact.

11. The impact vest of claim 10, further comprising:
    at least one flotation cushion coupled to the vest body.

12. The impact vest of claim 10, wherein the first material and second material comprise an inflatable cushion attached to the vest body.

13. The impact vest of claim 12, further comprising:
    a sensor configured to detect a presence of water; and
    an inflation mechanism configured to inflate the inflatable cushion from a non-expanded state to a deployed state, in response to receiving a signal from the sensor, the signal indicating detection of the presence of water.

14. The impact vest of claim 10, wherein the first material and the second material comprises fibers.

15. The impact vest of claim 14, wherein at least a subset of the fibers comprises polyamide or polyester.

16. An impact vest comprising:
    a vest body including a front and a back, the vest body comprising a first material having a negative Poisson's ratio and a second material having a positive Poisson's ratio, the first material interspersed with cells of the second material, wherein the impact vest is configured to protect a subject wearing the vest body by at least partially absorbing a force associated with an impact.

17. The impact vest of claim 16, wherein the first material and second material comprise an inflatable cushion attached to the vest body.

18. The impact vest of claim 17, further comprising:
    a sensor configured to detect at least one of an impact and a presence of water; and
    an inflation mechanism configured to inflate the inflatable cushion from a non-expanded state to a deployed state, in response to receiving a signal from the sensor.

19. The impact vest of claim 16, wherein the first material and the second material comprises fibers.

20. The impact vest of claim 19, wherein at least a subset of the fibers comprise polyamide or polyester.

* * * * *